United States Patent

Yoo et al.

[11] Patent Number: 6,085,091
[45] Date of Patent: Jul. 4, 2000

[54] METHOD FOR CONTROLLING HAND OFF OF MOBILE TERMINAL IN CODE DIVISION MULTIPLE ACCESS MOBILE COMMUNICATION SYSTEM

[75] Inventors: Dong Hwa Yoo; Go Whan Jin; Moo Ho Cho; Cheol Hye Cho, all of Taejon-shi, Rep. of Korea

[73] Assignee: Electronics and Telecommunications Research Institute, Taejon, Rep. of Korea

[21] Appl. No.: 09/063,666

[22] Filed: Apr. 21, 1998

[30] Foreign Application Priority Data

Apr. 25, 1997 [KR] Rep. of Korea ...................... 97-15694

[51] Int. Cl.[7] ........................................................ H04Q 7/20
[52] U.S. Cl. ........................... 455/441; 455/436; 370/332; 370/335
[58] Field of Search ...................................... 455/433, 435, 455/436, 437, 438, 439, 441, 442, 440, 456, 445, 457; 370/320, 335, 342, 441, 479, 331, 332, 333, 334; 375/200, 205, 208

[56] References Cited

U.S. PATENT DOCUMENTS 5,513,380  4/1996  Ivanov et al. .
5,640,414  6/1997  Blakeney et al. ........................ 455/436

*Primary Examiner*—Reinhard J. Eisenzopf
*Assistant Examiner*—Sam Bhattacharya
*Attorney, Agent, or Firm*—Cohen, Pontani, Lieberman & Pavane

[57] ABSTRACT

The present invention relates a method for controlling hand off of a mobile terminal in CDMA mobile communication system which controls hand off of a mobile terminal by dividing the mobile terminals into mobile terminals of high mobile speed and mobile terminals of low mobile speed in CDMA mobile communication system. The invention includes the steps of: a first step of transmitting coordinates of three adjacent base stations to the mobile terminal by calculating the coordinates of three adjacent base stations by transmitting a pseudo noise code offset information of base stations of three adjacent cells which have the greatest pseudo noise code offset values to a base station which is currently servicing by measuring the pseudo noise code; a second step of calculating the distance between the mobile terminal and each of the base stations received from the base station which is currently servicing; a third step of proceeding to a traffic condition after setting up a call; and a fourth step of repeating the first step to the third step if a predetermined trace period is reached, or requesting a hand off and proceeding to the traffic condition according to measured speed by measuring the speed of the mobile terminal if a hand over event occurs, or aborting a position trace of the mobile terminal if the call is completed.

3 Claims, 3 Drawing Sheets

$$(x-x_1)^2 + (y-y_1)^2 = L_1^2 \quad \cdots \cdots 201$$

$$(x-x_2)^2 + (y-y_2)^2 = L_2^2 \quad \cdots \cdots 202$$

$$(x-x_3)^2 + (y-y_3)^2 = L_3^2 \quad \cdots \cdots 203$$

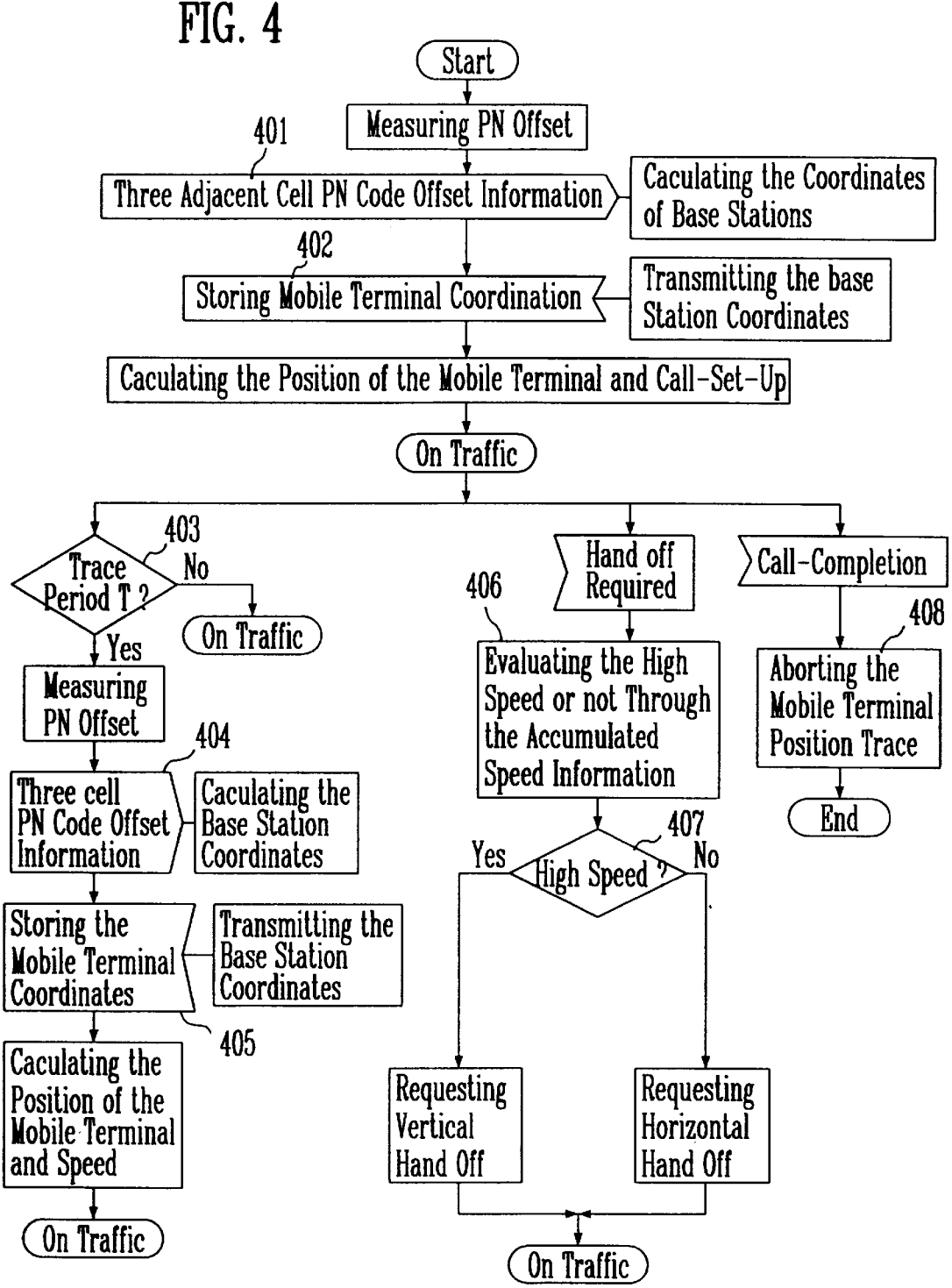

METHOD FOR CONTROLLING HAND OFF OF MOBILE TERMINAL IN CODE DIVISION MULTIPLE ACCESS MOBILE COMMUNICATION SYSTEM

BACKGROUND OF THE INVENTION

1. Field of the Invention

The present invention relates to Code Division Multiple Access (CDMA) mode mobile communication and, in particular, to a method for controlling hand off of a mobile terminal in CDMA mobile communication system which controls hand off of a mobile terminal by dividing the mobile terminals into mobile terminals of high mobile speed and mobile terminals of low mobile speed in CDMA mobile communication system.

2. Description of the Related Art

Among conventional methods for controlling hand off to which the mobile speed of mobile terminal is applied, there are a method which uses doppler frequency of Rayleigh fading signal and a method which calculates the speed of mobile terminal by using a diversity receiver, etc. However, these methods are single cell measuring methods based on current service cells and have disadvantage of reduced accuracy. Therefore, a method of controlling hand off of a mobile terminal is required to which a method of calculating the position and speed of the mobile terminal which can trace more accurate speed of mobile terminal by tracing the position of the mobile terminal by using three adjacent cells, after the mobile terminal initiates a call.

SUMMARY OF THE INVENTION

The present invention is invented to satisfy the requirements described above, and the object of the present invention is to provide a method for controlling hand off of a mobile terminal in CDMA mobile communication system which reduces frequent hand off of high speed mobile terminal in a micro cell by controlling hand off according to the speed of mobile terminal into high speed and low speed by performing the periodic position trace and speed calculation of mobile terminal.

The present invention to accomplish the objects described above is a method for controlling a hand off of mobile terminal in Code Division Multiple Access mobile communication system including a plurality of base stations and mobile stations comprising the steps of: a first step of transmitting coordinates of three adjacent base stations to said mobile terminal by calculating said coordinates of three adjacent base stations by transmitting a pseudo noise code offset information of base stations of three adjacent cells which have the greatest pseudo noise code offset values to a base station which is currently servicing by measuring the pseudo noise code; a second step of calculating the distance between said mobile terminal and each of said base stations and the position of said mobile terminal by using information of said each base stations received from the base station which is currently servicing; a third step of proceeding to a traffic condition after setting up a call; and a fourth step of repeating said first step to said third step if a predetermined trace period is reached, of requesting a hand off and proceeding to said traffic condition according to measured speed by measuring the speed of said mobile terminal if a hand over event occurs, or aborting a position trace of said mobile terminal if said call is completed.

BRIEF DESCRIPTION OF THE DRAWINGS

For fuller understanding of the nature and object of the invention, reference should be had to the following detailed description taken in conjunction with the accompanying drawings in which:

FIG. 4 is a flow chart showing a method for controlling hand off using the mobile terminal position trace period according to the present invention.

Similar reference characters refer to similar parts in the several views of the drawings.

DETAILED DESCRIPTION OF PREFERRED EMBODIMENT

The present invention will be described in detail with reference to the accompanying drawings.

Figure 1:
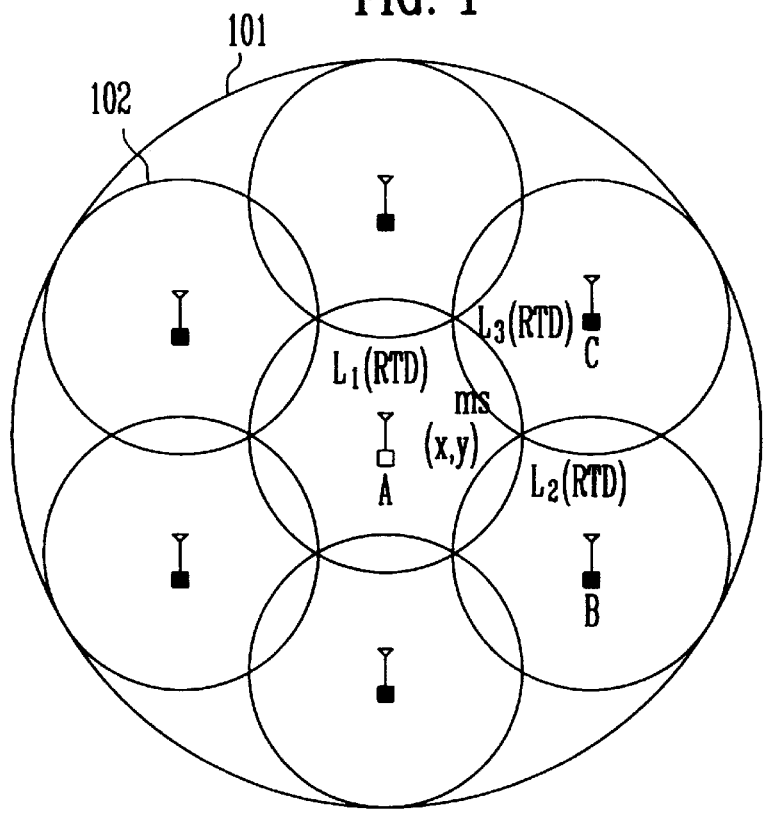
FIG. 1 is a conceptual drawing for explanation of method for calculation of distance between a base station and mobile terminal according to the present invention.

FIG. 1 is a conceptual drawing for explanation of method for calculation of distance between a base station and mobile terminal. Reference number 101 represents a macro cell and 102 represents a micro cell. L1, L2 and L3 represent distances between the mobile terminal and three adjacent cells selected by the mobile terminal which distances are calculated by using a Round Trip Delay (RTD) according to the present invention.

The distance L1, L2, L3 calculation method is described below.

A pseudo noise code of a pilot channel transmitted from the base station is received to the mobile station in the state of being delayed by certain chips according to the distance between the mobile station and base station. The mobile station performs an inverse spreading process by locking the mobile station's own local pseudo noise(PN) to the pilot signal. Since the accuracy of a locking device used in the mobile station and base station is in the unit of ⅛ chip, the accuracy of distance between the mobile station and base station is about 9.155 m (based of Pilot PN code transmission rate of 4.096 Mcps) which is a distance a wave proceeds during a duration of ⅛ chip. Therefore, if D which is a value of path which has smallest RTD value among RTD measured at the locking device between the mobile station and base station and ensures an allowed signal energy is D=a+b/8 chip, then the distance L between the mobile terminal and base station is D(a+b/8=a×8+b=$C_1$(⅛ chip))×9.155 m.

Figure 2:
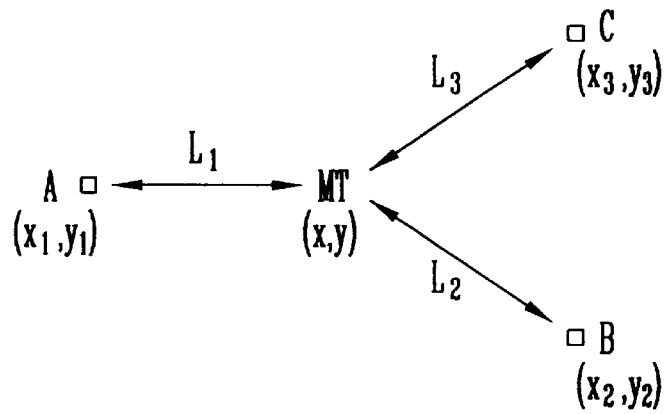
FIG. 2 is a conceptual drawing for explanation of method for calculation of mobile terminal position using the distances between three adjacent cells according to the present invention.

FIG. 2 shows a method of calculating the mobile terminal position by using distances between three adjacent cells according to the present invention. In FIG. 2, distances between the mobile terminal and base stations A, B, C of three the mobile terminal are denoted by L1, L2 and L3. Base stations A, B and C of adjacent cell are represented by coordinates of X and Y by using the latitude and longitude, and distances between the mobile terminal and adjacent cells are L1, L2 and L3, therefore, relations between the mobile terminal and base stations can be configured as circles respectively having radii of L1, L2, L3. 201 is an equation which configures as a circle the relation between the base station A and mobile terminal, 202 the relation between the base station B and mobile terminal, and 203 the relation between the base station C and mobile terminal. Current position coordinates X, Y of the mobile terminal is calculated as follows by using the equations 201 and 202.

$$y=(-L_1^2+L_2^2+x_1^2+y_1^2-x_2^2-y_2^2-2x(x_1-x_2))/2(y_1-y_2)$$ [Equation 1]

If the equation 1 is applied to the equation 201, two x values are obtained, and if the two x values are applied to equation 1 again, then two y values are obtained so that two x and y coordinates representing the position of mobile terminal are obtained. x and y coordinates satisfying the equation 203 when applying two x and y mobile terminal coordinates to equation 203 become the accurate position coordinates of mobile terminal. If the position information of mobile terminal is periodically traced with the method described above, then the mobile speed calculation of mobile terminal is possible, so that when the hand off of mobile terminal is required, the hand off type can be determined by dividing the mobile terminals into high speed and low speed.

Figure 3:
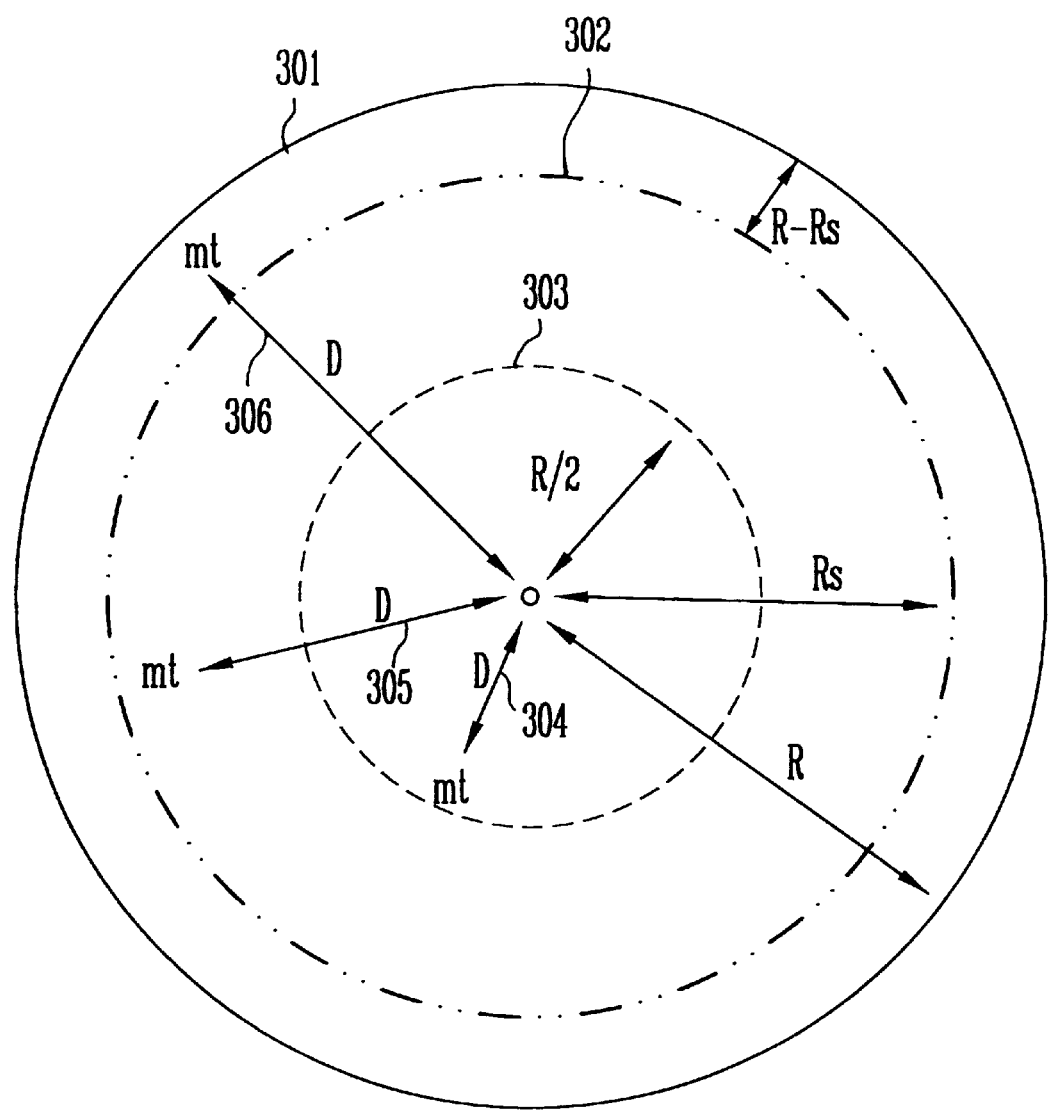
FIG. 3 is a conceptual drawing for explanation of method for calculation of position trace period according to the distance between the base station and mobile terminal according to the present invention.

FIG. 3 explains the periodic position trace time calculation method of mobile terminal. The position trace periods T of mobile terminal are differently defined according to the position where the mobile terminal starts position trace, that is, the distance D between the base station and mobile terminal. Reference number 301 is a service of current cell having value of R, and reference number 302 represents soft hand off area a boundary of current cell and has a value of Rs. Reference number 304 is a case where the mobile terminal exists in the interval of 0≦D≦R/2 adjacent the base station, the period T is defined as (Rs−R/2)/$V_{MAX}$, and here $V_{MAX}$ means mobile terminal maximum speed in the area of being serviced and it is transmitted to mobile terminal by using a paging channel or traffic channel. 305 is a case where the mobile terminal exists in the interval of R/2≦D≦Rs, the period T is defined as (Rs−D)/$V_{MAX}$, 306 is a case where the mobile terminal exists in the soft hand off area (Rs≦D≦R), and the period T is defined as 2 ×(R−Rs)/$V_{MAX}$. These position trace period definition facilitate at least one position trace before the mobile terminal requires the hand off when calculation the next position trace period after performing the position trace of the mobile terminal when the mobile terminal is in the hand off area boundary, that is, the distance D is 0≦D≦Rs. In addition, the position trace period definition, by making the mobile terminal trace the position of mobile terminal, does not influence the load on the base station by position trace and speed calculation and reduces the load on the mobile terminal by applying the position trace period not constant but according to the position of mobile terminal.

FIG. 4 shows a mobile position trace and speed calculation method and a hand off process method using the same according to the present invention.

If the mobile terminal performs a call setup process, the mobile terminal selects three adjacent base stations where the PN code signal values are measured to be large. In step 401, the mobile terminal transmits the PN code offset information of base stations selected by the mobile terminal to the base station which is currently servicing, and the base station which received the PN code offset information calculates the coordinates of adjacent base station by using the information. In step 402, the base station coordinates calculated is transmitted to mobile terminal. Thereafter, the mobile terminal performs the distance calculation between the mobile terminal and base stations selected by the mobile terminal and the position calculation of mobile terminal, the proceeds to traffic condition. In step 403, if the mobile terminal position trace period T is reached during the traffic, the mobile terminal selects three adjacent base stations where the PN code signal values are measured to be large and in steps 404 and 405 in which same functions as in steps 401 and 402 are performed, the mobile terminal performs the position and speed calculation and storage of mobile terminal and proceeds to traffic condition and maintains the traffic condition in case where the trace period T is not reached. If the hand off is required during the traffic, the mobile terminal evaluates the high speed or not of mobile terminal by calculating the mobile terminal average speed in step 406 in current service cell by using speed information of mobile terminal calculated in current service cell. Step 407 decides the hand off type by discriminating whether the mobile terminal is at high speed or low speed by using average speed information of the mobile terminal calculated by the mobile terminal in step 406. The mobile terminal requests the vertical hand off in case of high speed and horizontal hand off in case of low speed and performs the function appropriate to each hand off type, and thereafter, proceeds to traffic condition. If call completion occurs, the mobile aborts the mobile terminal position trace function at step 408.

The method of controlling the hand off of mobile terminal in CDMA mobile communication system according to the present invention described above is not limited to the claims and drawings, and various replacement, alteration and changes that can be done by anyone who has normal knowledge in the field to which the present invention belongs in the scope of the thought of the present invention belong to the scope of the thought of the present invention.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and the spirit of the present invention are to be encompassed as further embodiments of the present invention.

What is claimed:

1. A method for controlling a handoff of a mobile terminal in a Code Division Multiple Access (CDMA) mobile communications system having a plurality of base stations and a plurality of mobile stations, comprising the steps of:
   a. initiating a call setup from the mobile terminal by selecting three adjacent ones of said plurality of base stations having the largest pseudo noise (PN) code signal values;
   b. transmitting coordinates of said three adjacent ones of said plurality of base stations from the mobile terminal to one of said plurality of base stations currently servicing the mobile terminal by transmitting a PN code offset value for each of said three adjacent ones of said plurality of base stations;
   c. calculating the distance between said mobile terminal and each of said three adjacent ones of said plurality of base stations;
   d. proceeding to a traffic condition after completing the call setup;

e. determining whether the mobile terminal has reached a predetermined trace period and repeating steps a.–d. if the predetermined trace period is reached;

f. determining whether a handoff is required and requesting the handoff according to a measured speed of the mobile terminal if the handoff is required and proceeding to a traffic condition in step d., wherein the speed of the mobile terminal is measured each time a handoff occurs; and g. determining if the call is completed and aborting a position trace of the mobile terminal if the call is completed.

2. The method of claim 1, wherein said step f. comprises requesting a horizontal handoff if the measured speed of the mobile terminal is less than a reference speed and requesting a vertical handoff if the measured speed of the mobile terminal is greater than or equal to the reference speed.

3. The method of claim 1, wherein said step e. further comprises the step of calculating the trace period as follows:

in the interval $0 \leq D \leq R/2$ from the base station currently servicing the mobile terminal, the trace period T is defined as $(Rs-R/2)/V_{Max}$;

in the interval $R/2 \leq D \leq Rs$ from the base station currently servicing the mobile terminal, the trace period T is defined as $(Rs-D)/V_{max}$;

wherein D=the distance between the mobile terminal and the base station currently servicing the mobile terminal, Rs is a handoff boundary area, R is a service area boundary of the base station currently servicing the mobile terminal, and $V_{max}$ is a maximum speed of the mobile terminal.

* * * * *